(12) United States Patent
Jiang et al.

(10) Patent No.: US 12,353,742 B2
(45) Date of Patent: Jul. 8, 2025

(54) METHOD, DEVICE, AND COMPUTER PROGRAM PRODUCT FOR DATA DEDUPLICATION

(71) Applicant: Dell Products L.P., Round Rock, TX (US)

(72) Inventors: Changxu Jiang, Chengdu (CN); Fei Wang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/225,355

(22) Filed: Jul. 24, 2023

(65) Prior Publication Data

US 2024/0248626 A1    Jul. 25, 2024

(30) Foreign Application Priority Data

Jan. 20, 2023   (CN) .......................... 202310079498.4

(51) Int. Cl.
  *G06F 12/00*       (2006.01)
  *G06F 3/06*        (2006.01)
(52) U.S. Cl.
  CPC .......... *G06F 3/0641* (2013.01); *G06F 3/0619* (2013.01); *G06F 3/065* (2013.01); *G06F 3/0673* (2013.01)

(58) Field of Classification Search
  CPC ..... G06Q 30/0246; H04L 51/42; H04L 51/48; H04L 51/52
  See application file for complete search history.

(56) References Cited

U.S. PATENT DOCUMENTS

| | | | |
|---|---|---|---|
| 9,411,815 B1 * | 8/2016 | Lu | G06F 11/1453 |
| 10,248,510 B2 | 4/2019 | Chen et al. | |
| 10,467,102 B1 | 11/2019 | Baruch et al. | |
| 10,929,424 B1 | 2/2021 | Vaidya | |
| 2014/0181034 A1 | 6/2014 | Harrison et al. | |
| 2019/0236163 A1 * | 8/2019 | Bassov | G06F 16/128 |
| 2020/0133923 A1 * | 4/2020 | Bassov | G06F 16/1752 |

* cited by examiner

*Primary Examiner* — Arvind Talukdar
(74) *Attorney, Agent, or Firm* — BainwoodHuang

(57) ABSTRACT

Techniques for data deduplication compress and deduplicate a first set of blocks written to a source system to obtain a second set of blocks and compression ratios and numbers of duplications for blocks in the second set of blocks. Such techniques receive a request to back up the first set of blocks. Such techniques reconstruct, in response to receiving the request to back up the first set of blocks, the second set of blocks to obtain the first set of blocks. Such techniques mark, based on the compression ratios and the numbers of duplications, blocks in the first set of blocks with deduplication flags to obtain a third set of blocks. Such techniques transmit the third set of blocks to a destination system.

11 Claims, 13 Drawing Sheets

METHOD, DEVICE, AND COMPUTER PROGRAM PRODUCT FOR DATA DEDUPLICATION

CROSS-REFERENCE TO RELATED APPLICATION

This application claims priority to Chinese Patent Application No. CN202310079498.4, on file at the China National Intellectual Property Administration (CNIPA), having a filing date of Jan. 20, 2023, and having "METHOD, DEVICE, AND COMPUTER PROGRAM PRODUCT FOR DATA DEDUPLICATION" as a title, the contents and teachings of which are herein incorporated by reference in their entirety.

TECHNICAL FIELD

The present disclosure relates to the field of data protection, and in particular, to a method, a device, and a computer program product for data deduplication.

BACKGROUND

The value of data is widely recognized by the public in today's society, and for storage products, functions of data protection, such as data replication and data backup, are very important. With the development of informatization of the society and the rapid growth of data volume, more and more data needs to be backed up and recovered in data backup systems. Data deduplication technology has been widely applied in data backup systems as a kind of lossless data compression technology.

Online deduplication technology refers to performing a process of data deduplication while storing the data onto a storage device. In other words, duplicate data has already been removed before it is stored onto a hard disk. A recovery point objective is the maximum time interval that an organization expects to recover from data loss during a disaster. If the recovery point objective is not met, the likelihood of losing a significant amount of critical data during downtime increases. Performing online deduplication of all incoming data blocks during an intensive recovery point objective time presents challenges for both a central processing unit (CPU) and a memory.

SUMMARY OF THE INVENTION

According to an embodiment of the present disclosure, a method for data deduplication is provided. The method includes: compressing and deduplicating a first set of data blocks written to a source data storage system to obtain a second set of data blocks and compression ratios and numbers of duplications for data blocks in the second set of data blocks; receiving a request to back up the first set of data blocks; reconstructing, in response to receiving the request to back up the first set of data blocks, the second set of data blocks to obtain the first set of data blocks; marking, based on the compression ratios and the numbers of duplications, data blocks in the first set of data blocks with deduplication flags to obtain a third set of data blocks; and transmitting the third set of data blocks to a destination storage system.

In a second aspect of the present disclosure, an electronic device is provided. The electronic device includes one or more processors; and a storage apparatus configured to store one or more programs, where the one or more programs, when executed by the one or more processors, cause the one or more processors to implement the method according to the first aspect of the present disclosure.

In a third aspect of the present disclosure, a computer-readable storage medium is provided. A computer program is stored thereon. When executed by a processor, the program implements the method according to the first aspect of the present disclosure.

It should be understood that the content described in the Summary of the Invention section is neither intended to limit key or essential features of the embodiments of the present disclosure, nor intended to limit the scope of the present disclosure. Other features of the present disclosure will become readily understood from the following description.

BRIEF DESCRIPTION OF THE DRAWINGS

The above and other features, advantages, and aspects of the embodiments of the present disclosure will become more apparent with reference to the accompanying drawings and the following detailed description. In the accompanying drawings, identical or similar reference numerals represent identical or similar elements, in which.

DETAILED DESCRIPTION

Figure 1:
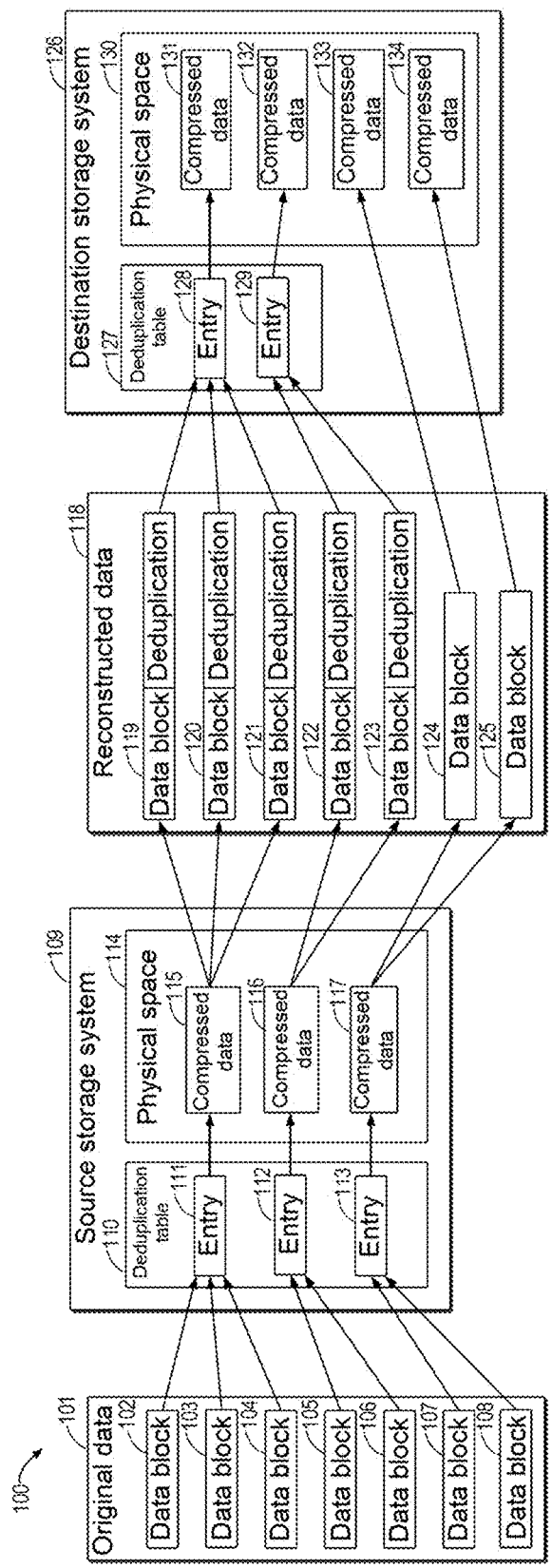
FIG. 1 illustrates a schematic diagram of an example environment in which a plurality of embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for example purposes only, and are not intended to limit the protection scope of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As mentioned above, for storage products, functions of data protection, such as data replication and data backup, are very important. For any replication session, data replication will not achieve the goal of protecting data when the synchronization process exceeds the recovery point objective time. In a process of data replication or data backup, data is transmitted from a source storage system to a destination storage system. In the case where the destination storage system does not support online deduplication of data, the current common method of performing data replication using deduplication technology will replicate all the data to a destination storage pool.

As the demand for data backup increases, the backup footprint generated during data backup is also increasing. Performing online deduplication of all incoming data blocks during an intensive recovery point objective time presents challenges for both a CPU and a memory. It is difficult to guarantee the speed of data transfer when performing online deduplication of intensive incoming data blocks. In addition, since the source storage system usually has a better configuration than the destination storage system, the source storage system has enough resources to maintain a large online deduplication table, while the destination storage system hardly has enough resources to maintain an online deduplication table as large as the online deduplication table of the source storage system.

On the other hand, skipping online deduplication for all the incoming data and then performing deferred deduplication (that is, deduplication is not performed while performing writing to the destination storage system, wherein the original data is first written to a hard disk, and then a background process is started to deduplicate the original data) is very uneconomical because deferred deduplication requires that the data be written to the hard disk and then read out again for comparison.

One solution is to, upon receiving an intensive data backup request, perform online deduplication for part of data blocks and skip online deduplication for the other part of data blocks. However, there is currently no good policy to help decide which data blocks should be prioritized for online deduplication and which data blocks should be skipped for online deduplication, which leads to a situation where in most online deduplication scenarios, the destination storage system performs online deduplication for all the received data blocks when various resources such as CPU, memory, or hash tables are sufficient, and skips the online deduplication for all the next received data blocks when various resources are scarce, until the resource shortage is alleviated. Therefore, a better method for online deduplication of data is needed.

According to various embodiments of the present disclosure, a solution for data deduplication is provided which, in the embodiments of the present disclosure, includes: compressing and deduplicating a first set of data blocks written to a source data storage system to obtain a second set of data blocks and compression ratios and numbers of duplications for data blocks in the second set of data blocks; receiving a request to back up the first set of data blocks; reconstructing, in response to receiving the request to back up the first set of data blocks, the second set of data blocks to obtain the first set of data blocks; marking, based on the compression ratios and the numbers of duplications, data blocks in the first set of data blocks with deduplication flags to obtain a third set of data blocks; and transmitting the third set of data blocks to a destination storage system.

According to the embodiments of the present disclosure, the information on the compression ratios and the numbers of duplications for the data blocks can be used to determine data block candidates that are more preferably to be deduplicated in the destination storage system, thereby saving physical space in the destination storage system. In the solutions according to the embodiments of the present disclosure, since the destination storage system performs deduplication only for the data block candidates that are marked as needing deduplication, the calculation number of fingerprinting calculation for data blocks and the query number of querying the deduplication table in the destination storage system are reduced, thereby saving the consumption of CPU and memory and increasing the speed of the entire data backup process.

The embodiments of the present disclosure will be specifically described below with reference to the accompanying drawings.

FIG. 1 is a schematic diagram of example environment 100 in which a plurality of embodiments of the present disclosure can be implemented. In environment 100, original data 101 is data that will be written to source storage system 109. The original data includes data blocks 102, 103, 104, 105, 106, 107, and 108. A fingerprint algorithm can be used to perform a fingerprint calculation for each data block. The fingerprint obtained from the fingerprint calculation represents a unique identifier of the data block, and data blocks containing different data will obtain different fingerprints after fingerprint calculation, while two data blocks for which the same fingerprint is obtained from fingerprint calculation contain the same data. Based on this principle, data deduplication can be achieved by calculating fingerprints.

As illustrated in FIG. 1, source storage system 109 includes deduplication table 110 and storage space 114. Deduplication table 110 is a hash table, which includes a set of entries. For clarity, only three entries are illustrated in FIG. 1, namely entry 111, entry 112, and entry 113. Each entry stores a fingerprint of a data block and reference information for that data block, the reference information indicating a position in the physical space where the data block is stored. In the example illustrated in FIG. 1, data blocks 102, 103, and 104 all point to entry 111, indicating that they have the same fingerprint, so they will not all be stored in physical space 114 in the source storage system, but only one of them will be stored. To save the physical space, this data is compressed using a compression algorithm before being stored in physical space 114, resulting in compressed data 115, and compressed data 115 is then stored in physical space 114. Relevant information for compressed data 115 may be stored in the source storage system, including, for example, the compression ratio and the number of duplications. For example, in the example illustrated in FIG. 1, the number of duplications for compressed data 115 is 3. Similarly, in the example illustrated in FIG. 1, data blocks 105 and 106 point to entry 112, reference information in entry 112 points to compressed data 116, data blocks 107 and 108 point to entry 113, and reference information in entry 113 points to compressed data 117.

As illustrated in FIG. 1, upon receiving a request for data backup, the source storage system reconstructs the compressed data based on the deduplication table and the compressed data to obtain reconstructed data 118. Reconstructed data 118 includes data blocks 119, 120, 121, 122, 123, 124, and 125. Each data block in reconstructed data 118 corresponds to a data block in original data 101. For example, data block 119 is a reconstructed data block for data block 102, data block 120 is a reconstructed data block for data block 103, and so forth. According to embodiments of the present disclosure, when reconstructing a data block, based on the compression ratios and the numbers of duplications for the compressed data, the reconstructed data block is marked with a flag as to whether an online deduplication needs to be performed in the destination storage system. In some embodiments, data blocks for which online deduplication needs to be performed may be marked with a flag indicating deduplication needed, while data blocks for which online deduplication needs not to be performed may be marked with a flag indicating deduplication not needed. In some embodiments, data blocks for which online deduplication needs to be performed may be marked with a flag indicating deduplication needed, while data blocks for which online deduplication needs not to be performed may be not marked with a flag. For example, the reconstructed data blocks 119, 120, 121, 122, and 123 are marked with flags indicating deduplication needed while data blocks 124, 125 are not marked with flags indicating deduplication needed.

As illustrated in FIG. 1, the source storage system transmits data blocks in reconstructed data 118 to destination storage system 126. Destination storage system 126 includes deduplication table 127 and physical space 130. Since the configuration of destination storage system 126 is typically lower than that of source storage system 109, the size of deduplication table 127 in destination storage system 126 is typically smaller than that of deduplication table 110 in source storage system 109, that is, the number of entries in deduplication table 127 is smaller than the number of entries in deduplication table 110. Destination storage system 126 checks whether a received data block is marked with a flag indicating deduplication needed. Upon detecting that a data block is marked with a flag indicating deduplication needed, destination storage system 126 calculates the fingerprint of the data block and then queries whether this fingerprint exists in deduplication table 127. After a hit is determined, this data block is deduplicated, and information about this data block is updated. Upon detecting that a data block is not marked with a flag indicating deduplication needed, destination storage system 126 does not calculate the fingerprint of the data block, but instead compresses it directly and stores the same in physical space 130. For example, as illustrated in FIG. 1, data blocks 119, 120, and 121 with flags indicating deduplication needed and with the same fingerprint are stored as compressed data 131 in destination storage system 126, data blocks 122 and 123 with flags indicating deduplication needed and with the same fingerprint are stored as compressed data 132, and data blocks 124 and 125 without flags indicating deduplication needed and with the same fingerprint are stored as compressed data 133 and compressed data 134, respectively.

In some embodiments, source storage system 109 determines, based on the compression ratio at which a data block can be compressed, whether to mark this data block with a flag indicating deduplication needed. The difference in the space occupied by data blocks with low compression ratios before and after compression is small, while the difference in the space occupied by data blocks with high compression ratios before and after compression is large. Thus, the gain from deduplication of data blocks with low compression ratios is greater than the gain from deduplication of data blocks with high compression ratios.

Figure 2:
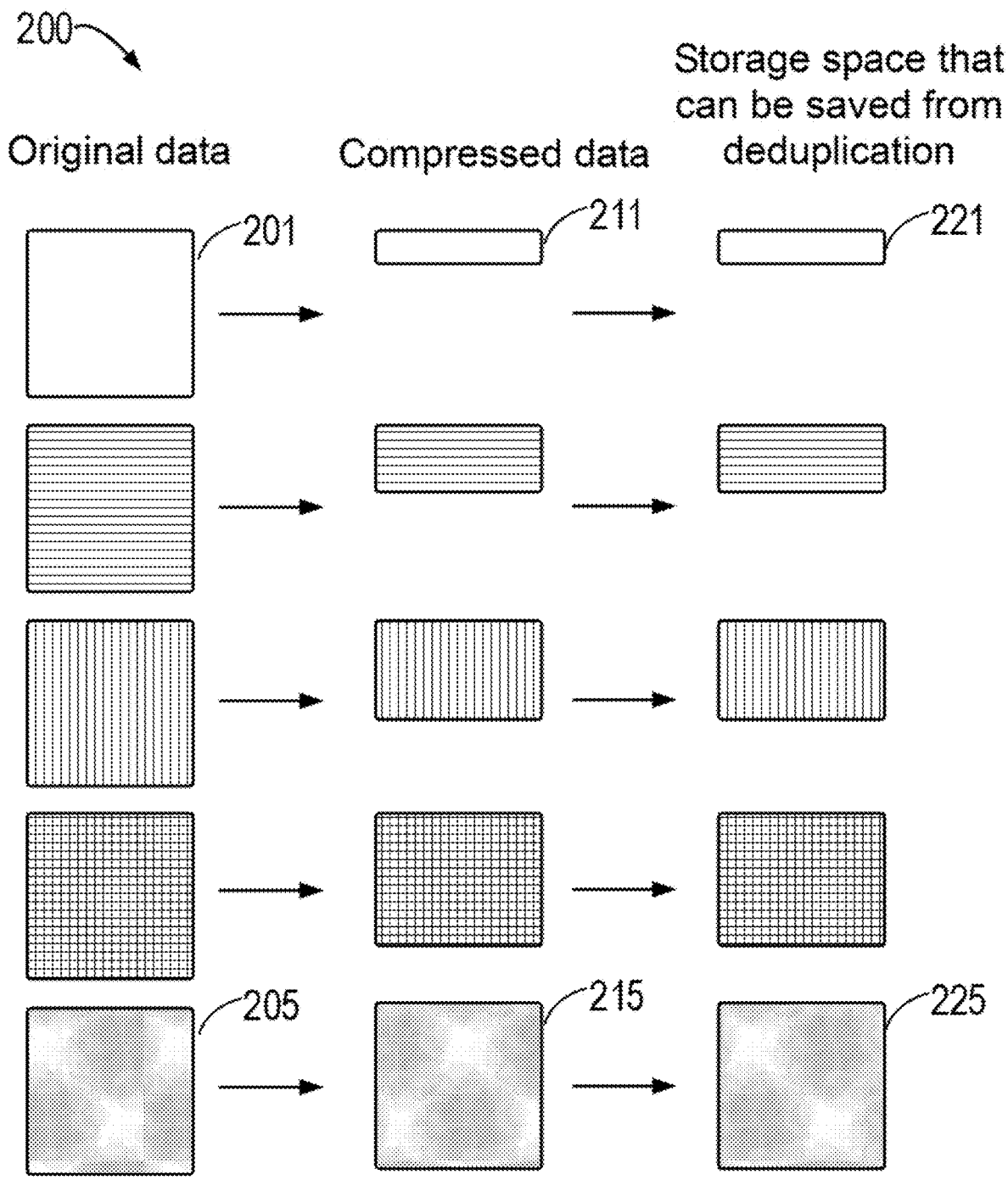
FIG. 2 illustrates a schematic diagram of physical space that can be saved from deduplicating data blocks having different compression ratios.

FIG. 2 illustrates schematic diagram 200 of physical space that can be saved from deduplicating data blocks having different compression ratios. In FIG. 2, data blocks 201, 202, 203, 204, and 205, which are original data, have the same data block size (e.g., 10 KB), but they have different compression ratios. For example, the compression ratio for data block 201 is 80%, then physical space 221 occupied by its compressed data 211 is 2 KB, so that 20 KB of physical space can be saved when data block 201 is deduplicated. The compression ratio for data block 205 is 0, which indicates that the size of this data block does not change before and after compression. Physical space 225 occupied by data 215 after data block 205 is compressed is 10 KB. Thus, in the case where the reconstructed data received by destination storage system 126 contains the same number of data blocks 201 and 205, deduplication of data block 205 will save more physical space than deduplication of data block 201 will do.

In some embodiments, source storage system 109 also determines, based on the number of duplications of a data block in source storage system 109, whether to mark this data block with a flag indicating deduplication needed. When a data block is written to source storage system 109 as original data, source storage system 109 calculates the fingerprint of this data block. Source storage system 109 then queries deduplication table 110 for this fingerprint. When an entry corresponding to the fingerprint of this data block is found in deduplication table 110 (i.e., an entry in deduplication table 110 is hit), this data block is deduplicated, and the number of duplications is increased. In the case where a set of data blocks have the same compression ratio, more space will be saved when a data block with a greater number of duplications is deduplicated in destination storage system 126.

In some embodiments, when a data block is reconstructed in source storage system 109, if the compression ratio for this data block is less than a predetermined compression ratio threshold and the number of duplications for this data block is greater than a predetermined duplication threshold, this data block is marked with a flag indicating deduplication needed. In some embodiments, although the compression ratio for a data block is not less than the predetermined compression ratio threshold, the number of duplications therefor exceeds the predetermined duplication threshold to a certain extent, and then this data block is marked with a flag indicating deduplication needed.

Figure 3A:
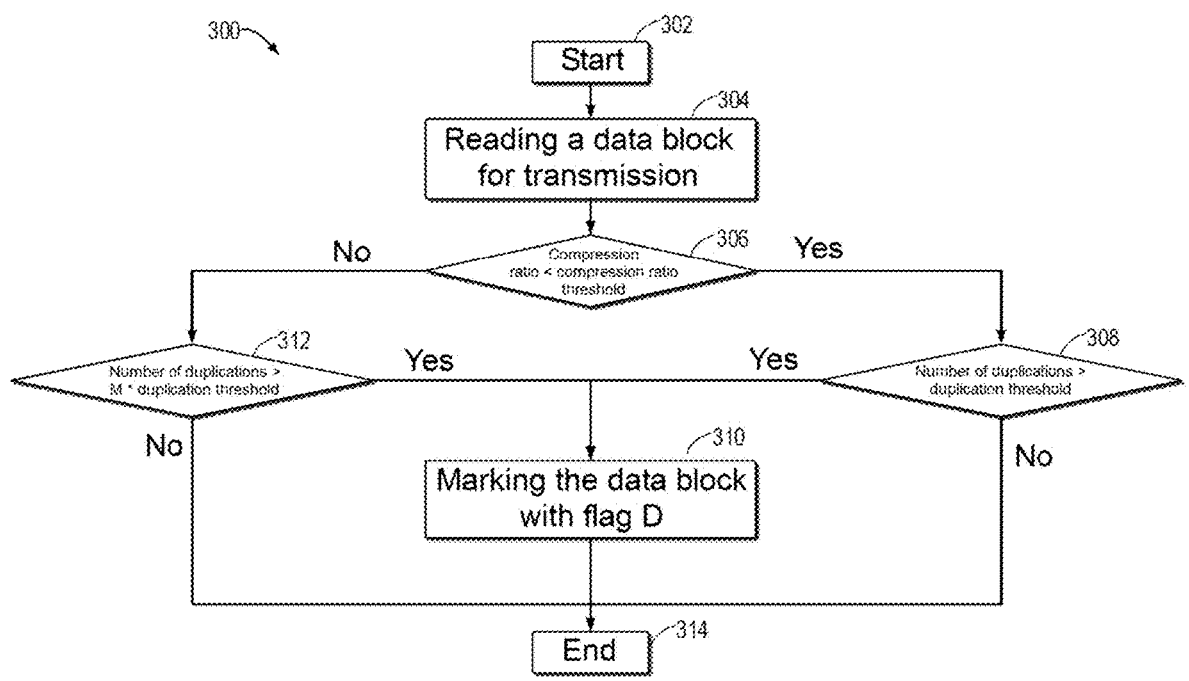
FIGS. 3A to 3B illustrate an example flow chart of selection of a deduplication candidate by a source storage system and an example flow chart of performing of a deduplication process by a destination storage system according to some embodiments of the present disclosure.
Figure 3B:
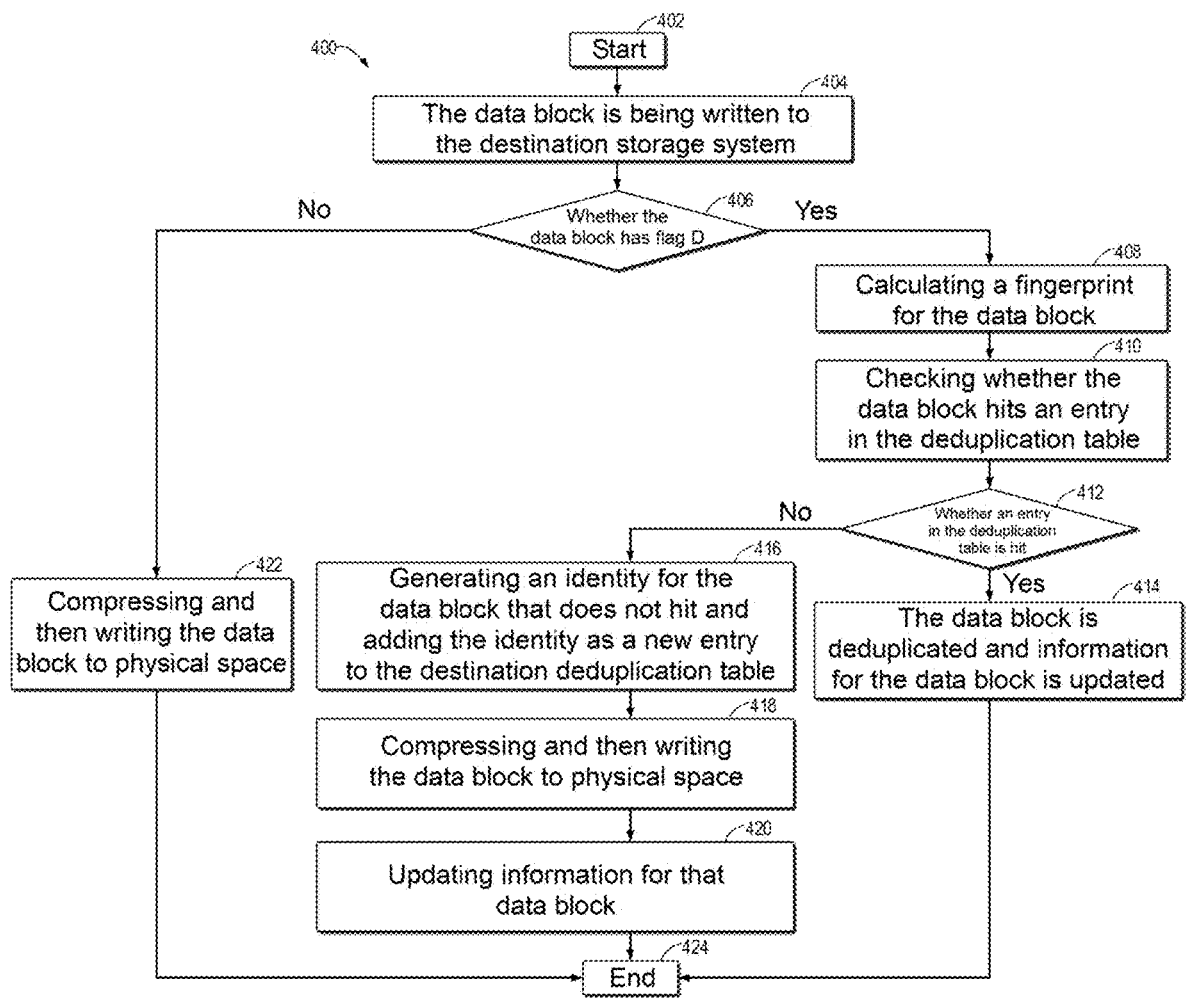

FIGS. 3A to 3B illustrate example flow chart 300 of selection of a deduplication candidate by a source storage system and example flow chart 400 of performing of a deduplication process by a destination storage system according to some embodiments of the present disclosure. FIG. 3A illustrates example flow chart 300 of selection of a deduplication candidate by a source storage system according to some embodiments of the present disclosure. Flow chart 300 begins at block 302. At block 304, source storage system 109 receives a request for data backup and reads a data block for transmission to destination storage system 126. At block 306, it is determined whether a compression ratio for the data block is less than a predetermined compression ratio threshold. In the case where it is determined that the compression ratio for the data block is less than the predetermined compression ratio threshold, the process moves to block 308 where it is determined whether the number of duplications for the data block is greater than a predetermined duplication threshold. In the case where it is determined that the number of duplications for the data block is greater than the duplication threshold, the process moves to block 310 where the data block is marked with flag D, flag D indicating that online deduplication needs to be performed on the data block in destination storage system 126. Returning to block 308, in the case where it is determined that the number of duplications for this data block is not greater than the duplication threshold, the data block is not marked with flag D. Returning to block 306, if the compression ratio for this data block is not less than the predetermined compression ratio threshold, it is determined whether the number of duplications thereof is less than M multiplied by the duplication threshold. In these embodiments, M is a coefficient greater than 1. In the case where it is determined that the number of duplications for the data block is greater than M multiplied by the duplication threshold, the process proceeds to block 310 where the data block is marked with flag D. After the data block is marked with flag D, or when it is determined at block 308 that the number of duplications for the data block is not greater than the duplication threshold, or when it is determined at block 312 that the number of duplications for the data block is not greater than M multiplied by the duplication threshold, process 300 ends at block 314.

FIG. 3B illustrates example flow chart 400 of performing of a deduplication process by a destination storage system according to some embodiments of the present disclosure. Flow chart 400 begins at block 402. At block 404, destination storage system 126 receives the reconstructed data block from source storage system 109, and the data block is being written to destination storage system 126. At block 406, it is determined whether the data block has flag D (that is, whether it is marked as needing deduplication). In the case where it is determined that the data block has flag D, the process proceeds to block 408 where a fingerprint of the data block is calculated. At block 410, the fingerprint of the data block is used to check, in deduplication table 127 of destination storage system 126, whether the data block hits an entry in deduplication table 127. At block 412, it is determined whether the data block hits an entry in deduplication table 127. In the case where it is determined that the data block hits an entry in deduplication table 127, the data block is deduplicated, and the information for the data block is updated in destination storage system 126. Returning to block 412, in the case where the data block does not hit an entry in deduplication table 127, the process proceeds to block 416 where an identity is generated for the data block, and the identity is added as a new entry to deduplication table 127 in destination storage system 126. At block 418, the data block is compressed and written to physical space. At block 420, information for that data block in deduplication table 127 is updated. Returning to block 406, in the case where the data block does not have flag D, neither the fingerprint of the data block is calculated nor deduplication table 127 is queried; instead, it is directly compressed and written to physical space 130. Process 400 ends at block 424.

As described above, the configuration of destination storage system 126 is typically lower than that of source storage system 109, and the process of querying the deduplication table in destination storage system 126 to determine whether a data block hits an entry in the table consumes a great number of CPU and memory resources. The larger the size of the deduplication table, the more CPU and memory resources are consumed.

In some embodiments, when source storage system 109 receives a request to perform data backup and reconstructs data, it may classify data blocks that are marked with flags indicating deduplication needed in the above embodiments based on the compression ratios and the numbers of duplications for the data blocks to be reconstructed. Source storage system 109 may mark different classifications of data blocks with different flags indicating deduplication needed. Accordingly, a plurality of deduplication tables of smaller size instead of deduplication table 127 having a very large table size are utilized in destination storage system 126. Since it consumes fewer CPU and memory resources to query whether a data block hits an entry in in a smaller-sized deduplication table, the speed of the overall data backup process can be improved.

In some embodiments, when the compression ratio for the data block is less than the predetermined compression ratio threshold and the number of duplications is greater than the predetermined duplication threshold, the data block is marked with a flag indicating deduplication needed (e.g., "DCL"). When the compression ratio for the data block is not less than the predetermined compression ratio threshold and the number of duplications exceeds the predetermined duplication threshold to a certain extent (e.g., the number of duplications is greater than M multiplied by the duplication threshold), the data block is marked with another flag indicating deduplication needed (e.g., "DCH"). When the data block is received at destination storage system 126, it is deduplicated online regardless of whether it is marked with the DCL or the DCH. The difference is that in the case of determining that the data block is marked with the DCL, a deduplication table corresponding to flag DCL is queried to determine whether an entry in that deduplication table is hit, while in the case of determining that the data block is marked with the DCH, a deduplication table corresponding to flag DCH is queried to determine whether an entry in that deduplication table is hit. By splitting deduplication table 127 into deduplication tables for DCL and DCH, respectively, the consumption of CPU and memory resources can be effectively saved, thereby improving the speed of the data backup process.

Figure 4A:
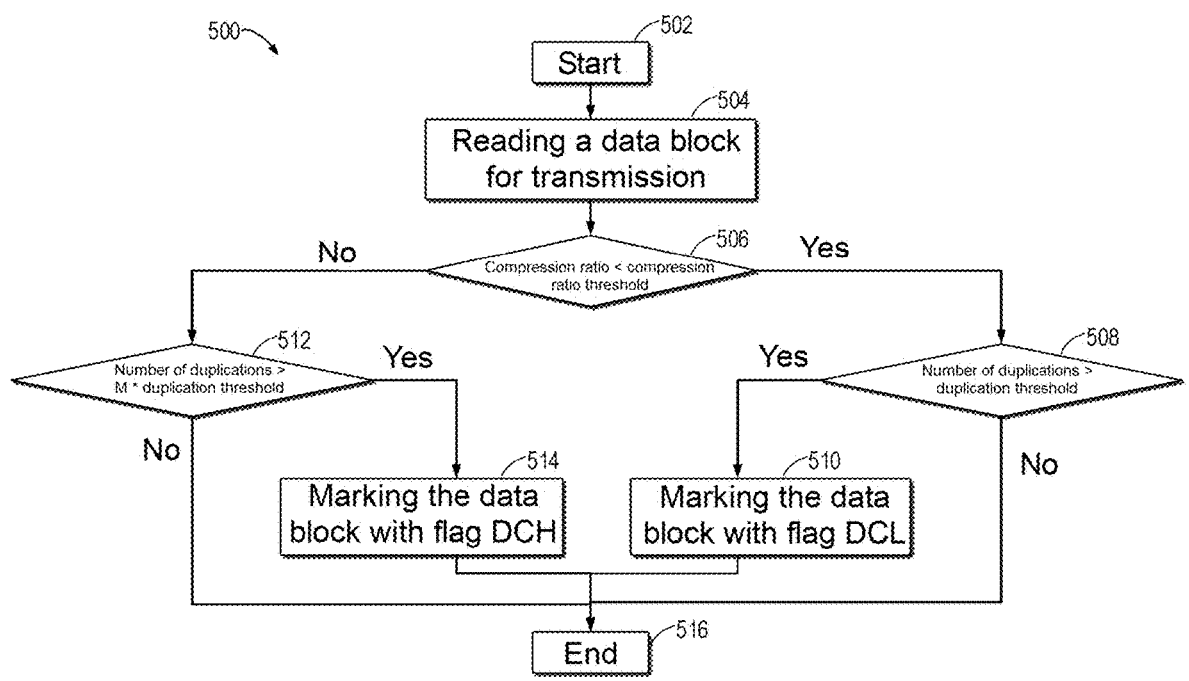
FIGS. 4A to 4B illustrate an example flow chart of selection of a deduplication candidate by a source storage system and an example flow chart of performing of a deduplication process by a destination storage system according to some other embodiments of the present disclosure.
Figure 4B:
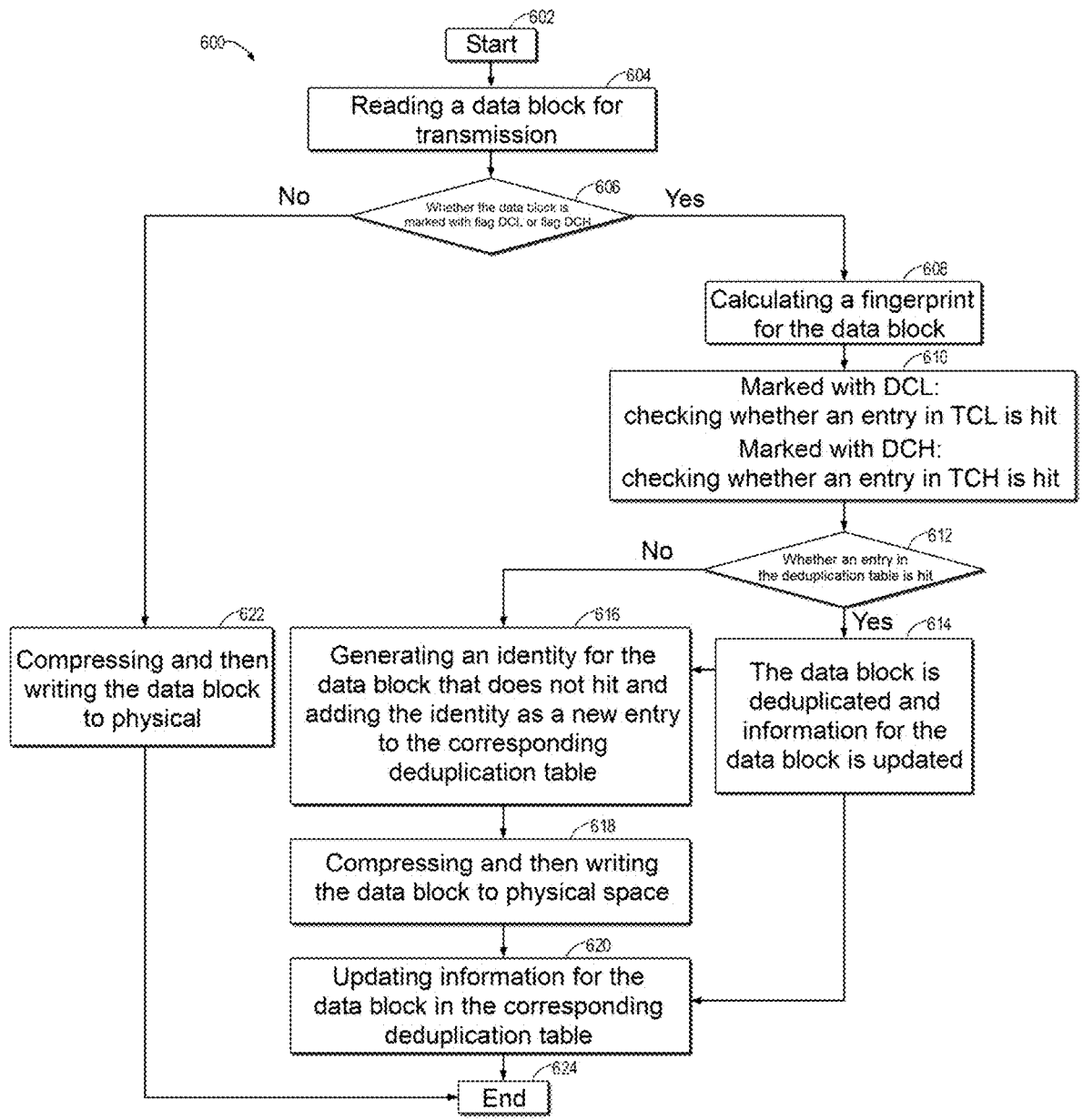

FIGS. 4A to 4B illustrate an example flow chart of selection of a deduplication candidate by a source storage system and an example flow chart of performing of a deduplication process by a destination storage system according to some other embodiments of the present disclosure. FIG. 4A illustrates example flow chart 500 of selection of a deduplication candidate by a source storage system according to some embodiments of the present disclosure. Flow chart 500 begins at block 502. At block 504, source storage system 109 receives a request for data backup and reads a data block for transmission to destination storage system 126. At block 506, it is determined whether a compression ratio for the data block is less than a predetermined compression ratio threshold. In the case where it is determined that the compression ratio for the data block is less than the predetermined compression ratio threshold, the process moves to block 508 where it is determined whether the number of duplications for the data block is greater than a predetermined duplication threshold. In the case where it is determined that the number of duplications for the data block is greater than the duplication threshold, the process moves to block 510 where the data block is marked with a DCL flag, wherein flag DCL indicates that online deduplication needs to be performed on the data block in destination storage system 126, and in the process of deduplication in destination storage system 126, the deduplication table corresponding to the DCL in destination system 126 is queried to determine whether the data block hits an entry in that deduplication table. Returning to block 508, in the case where it is determined that the number of duplications for this data block is not greater than the duplication threshold, the data block is not marked with a DCL flag. Returning to block 506, if the compression ratio for this data block is not less than the predetermined compression ratio threshold, it is determined whether the number of duplications thereof is less than M multiplied by the duplication threshold. In these embodiments, M is a coefficient greater than 1. In the case where it is determined that the number of duplications for the data block is greater than M multiplied by the duplication threshold, the process proceeds to block 514 where the data block is marked with flag DCH, wherein flag DCH indicates that online deduplication needs to be performed on the data block in destination storage system 126, and in the process of deduplication in destination storage system 126, the deduplication table corresponding to the DCH in destination system 126 is queried to determine whether the data block hits an entry in that deduplication table. After the data block is marked with flag DCL or DCH, or when it is determined at block 508 that the number of duplications for the data block is not greater than the duplication threshold, or when it is determined at block 512 that the number of duplications for the data block is not greater than M multiplied by the duplication threshold, process 500 ends at block 516.

FIG. 4B illustrates example flow chart 600 of performing of a deduplication process by a destination storage system according to some embodiments of the present disclosure. Flow chart 600 begins at block 602. At block 604, destination storage system 126 receives the reconstructed data block from source storage system 109, and the data block is being written to destination storage system 126. At block 606, it is determined whether the data block has flag DCL or DCH (that is, whether it is marked as needing deduplication). In the case where it is determined that the data block has flag DCL or DCH, the process proceeds to block 608 where a fingerprint of the data block is calculated. At block 610, the fingerprint of the data block is used to check, in a deduplication table corresponding to the DCL or DCH in destination storage system 126, whether the data block hits an entry in that deduplication table. At block 612, it is determined whether the data block hits an entry in the deduplication table corresponding to flag DCL or DCH. In the case where it is determined that the data block hits an entry in the corresponding deduplication table, the data block is deduplicated, and the information for the data block is updated in destination storage system 126. Returning to block 612, in the case where the data block does not hit an entry in the deduplication table corresponding to the DCL or DCH, the process proceeds to block 616 where an identity is generated for the data block, and the identity is added as a new entry to the deduplication table corresponding to flag DCL or DCH in destination storage system 126. At block 618, the data block is compressed and written to physical space. At block 620, information for that data block in the corresponding deduplication table is updated. Returning to block 606, in the case where the data block does not have flag DCL or DCH, neither the fingerprint of the data block is calculated nor the deduplication table corresponding to the DCL or DCH is queried; instead, it is directly compressed and written to physical space 130. Process 600 ends at block 624.

Figure 5A:
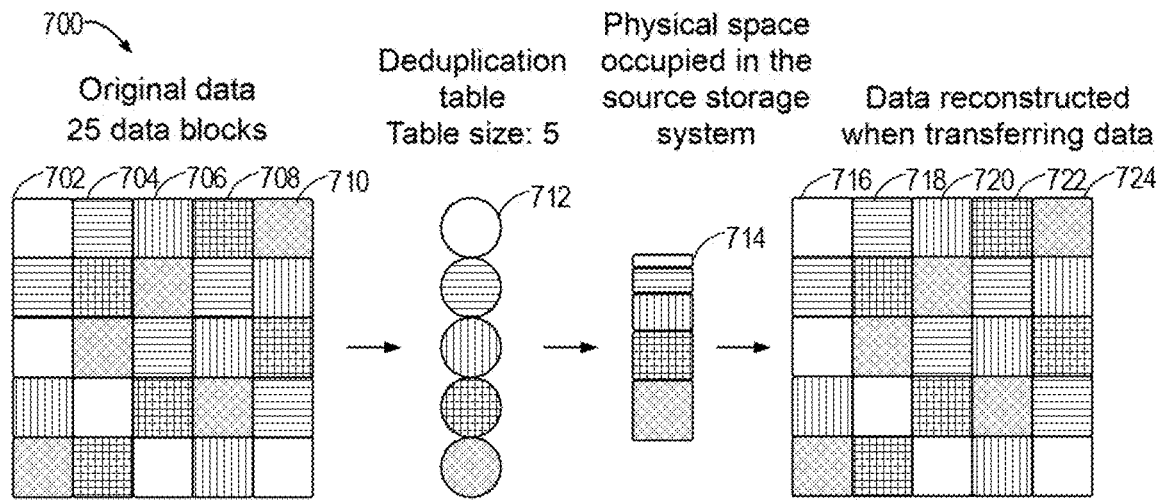
FIGS. 5A to 5B illustrate a schematic diagram of performing deduplication and transmission of data conventionally in a source storage system and a schematic diagram of performing data deduplication conventionally in a destination storage system.
Figure 5B:
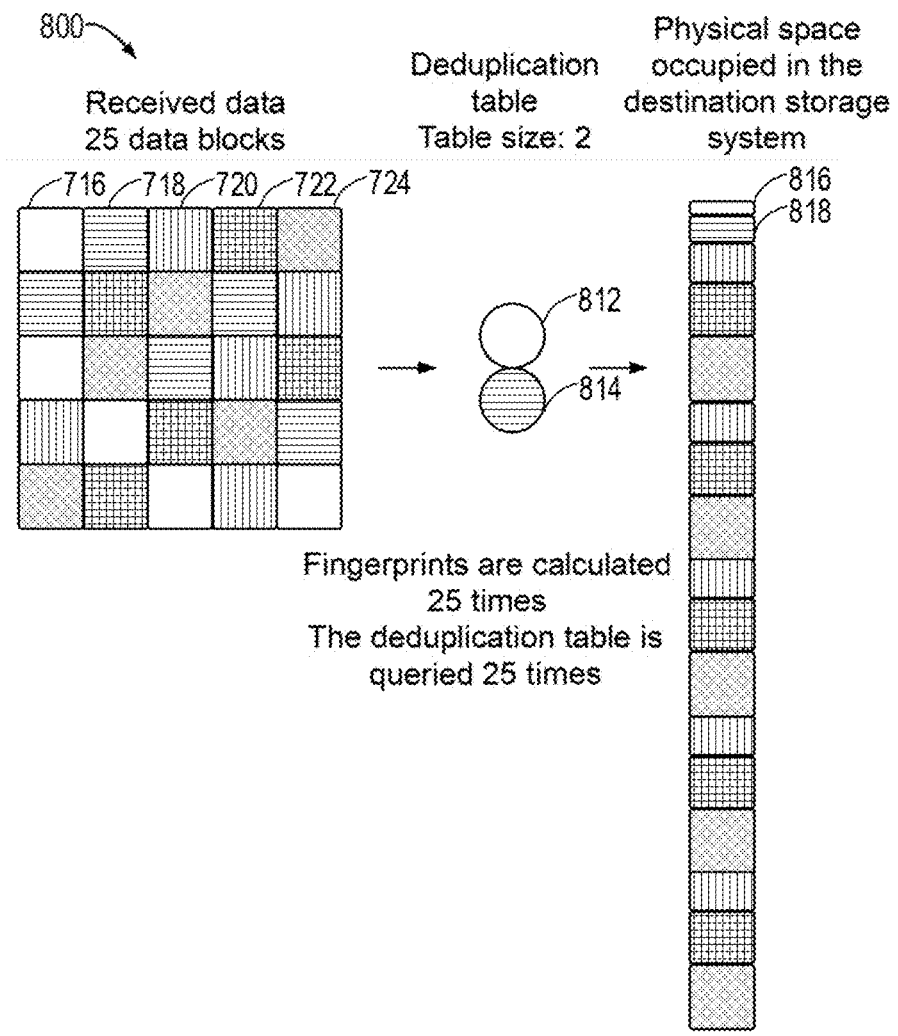

The embodiment described above will be described below by way of example. FIGS. 5A to 5B illustrate schematic diagram 700 of performing deduplication and transmission of data conventionally in a source storage system and schematic diagram 800 of performing data deduplication conventionally in a destination storage system. As illustrated in FIG. 5A, the original data includes 25 data blocks, of which the number of data blocks 702, 704, 706, 708, and 710 is five each (data blocks with the same pattern in the original data indicate data blocks with the same fingerprint). The table size of the deduplication table of source storage system 109 is 5, and there are no entries in this deduplication table in the initial state. When data block 702 is written to the source storage system, the fingerprint of data block 702 is calculated, and a corresponding entry is queried in the deduplication table. Since no corresponding entry is found through querying, data block 702 is compressed to obtain compressed data 714, which is stored in the physical space, and the corresponding entry is added to the deduplication table. In this way, the deduplication table is filled with five entries as data blocks 702, 704, 706, 708, and 710 are written to source storage system 109. As the remaining 20 data blocks are written, by calculating the fingerprints and querying the deduplication table, the 20 blocks are all deduplicated.

After source storage system 109 receives a request to perform data backup, the compressed data in the physical space is reconstructed into 25 data blocks corresponding to the original data. For example, data blocks 702, 704, 706, 708, and 710 correspond to data blocks 716, 718, 720, 722, and 724, respectively. Source storage system 109 then transmits the reconstructed data to destination storage system 126.

FIG. 5B illustrates schematic diagram 800 of performing data deduplication conventionally in a destination storage system. As illustrated in FIG. 5B, destination storage system 126 receives the 25 data blocks reconstructed in FIG. 5A, including data blocks 716, 718, 720, 722, and 724 and 20 data blocks with the same fingerprint as theirs. The table size of the deduplication table in destination storage system 126 is 2 (less than the table size 5 of the deduplication table in the source storage system), and there are no entries in this deduplication table in the initial state. Since the conventional schemes do not mark the reconstructed data with a flag as to whether deduplication is needed, it is necessary to calculate the fingerprint and query the deduplication table for each of the 25 data blocks. In the left-to-right and top-to-bottom order, for data block 716, the fingerprint is calculated, and the deduplication table is queried. Since the deduplication table is initially empty, new entry 812 corresponding to data block 716 is added. Then, for data block 718, the fingerprint is calculated, and the deduplication table is queried. Since the deduplication table is initially empty, new entry 812 corresponding to data block 716 is added. Data block 718 is then received, and after the fingerprint is calculated and the deduplication table is queried, new entry 814 is added to the deduplication table. Then, after data block 720 is received, the fingerprint is calculated, and the deduplication table is queried. Since the number of entries in the deduplication table has reached the upper limit of the size of that table, no further new entries are added to the deduplication table. As a result, except for data block 716, all data blocks that have the same fingerprint as that of data block 716 are deduplicated, and only compressed data 816 is stored in the physical space of the destination storage system. Similarly, except for data block 718, all data blocks that have the same fingerprint as that of data block 718 are deduplicated, and only compressed data 818 is stored in the physical space of the destination storage system. Other data blocks fail to hit an entry in the deduplication table and are therefore not deduplicated. As a result, multiple data blocks that have small compression ratios but fail to be deduplicated online appear in the physical space, resulting in a large amount of occupied physical space. Fingerprints are calculated 25 times and the deduplication table is queried 25 times in total in this process.

Figure 6A:
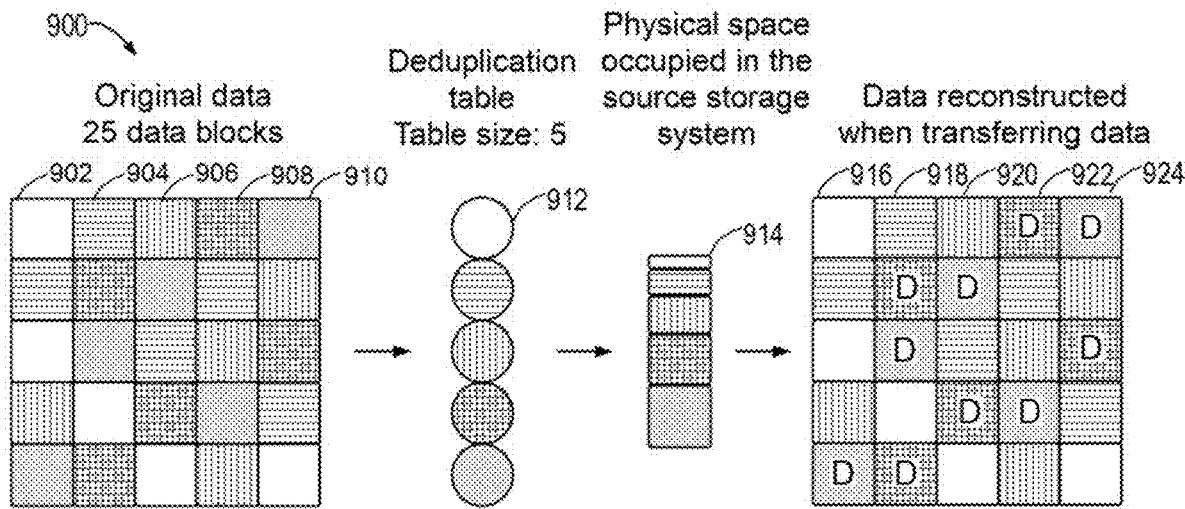
FIGS. 6A to 6B illustrate a schematic diagram of performing deduplication and transmission of data in a source storage system and a schematic diagram of performing data deduplication in a destination storage system according to some embodiments of the present disclosure.
Figure 6B:
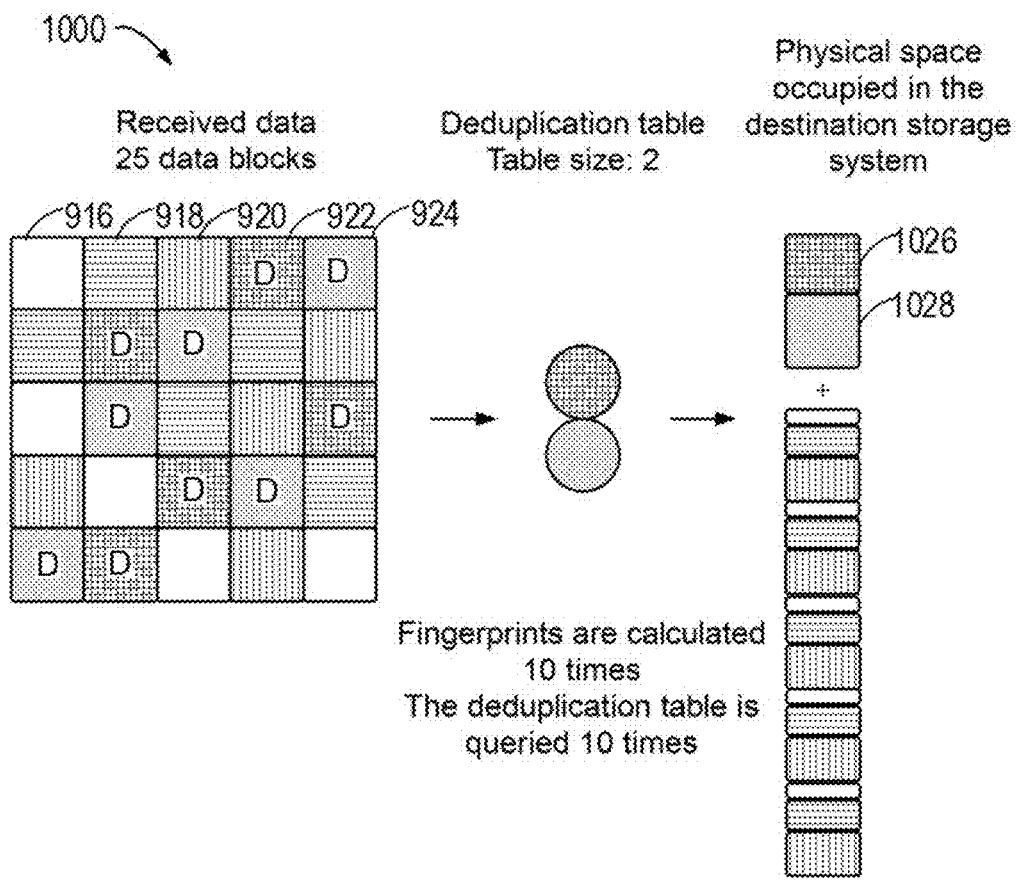

FIGS. 6A to 6B illustrate schematic diagram 900 of performing deduplication and transmission of data in a source storage system and schematic diagram 1000 of performing data deduplication in a destination storage system according to some embodiments of the present disclosure. As illustrated in FIG. 6A, the original data includes 25 data blocks, of which the number of data blocks 902, 904, 906, 908, and 910 is five each. The table size of the deduplication table of source storage system 109 is 5, and there are no entries in this deduplication table in the initial state. When data block 902 is written to the source storage system, the fingerprint of data block 902 is calculated, and the corresponding entry is queried in the deduplication table. Since the corresponding entry is not found through querying, data block 902 is compressed to obtain compressed data 914, which is stored in the physical space, and the corresponding entry is added to the deduplication table. In this way, the deduplication table is filled with five entries as data blocks 902, 904, 906, 908, and 910 are written to source storage system 109. As the remaining 20 data blocks are written, by calculating the fingerprints and querying the deduplication table, the 20 blocks are all deduplicated.

After source storage system 109 receives a request to perform data backup, the compressed data in the physical space is reconstructed into 25 data blocks corresponding to the original data. For example, data blocks 902, 904, 906, 908, and 910 correspond to data blocks 916, 918, 920, 922, and 924, respectively. During reconstruction, it is determined, based on the compression ratios and the numbers of duplications for a data block, whether to mark that data block with a flag indicating deduplication needed in order to make it a deduplication candidate. In this example, by setting the compression ratio threshold, data blocks 922 and 924 with the lowest compression ratio and data blocks with the same fingerprint as theirs can be marked with flag D (indicating need for deduplication).

FIG. 6B illustrates schematic diagram 1000 of performing data deduplication in a destination storage system according to some embodiments of the present disclosure. As illustrated in FIG. 6B, destination storage system 126 receives the 25 data blocks reconstructed in FIG. 6A, including data blocks 916, 918, 920, 922, and 924 and 20 data blocks with the same fingerprint as theirs. Among them, data blocks 922 and 924 and the data blocks having the same fingerprint as theirs are marked with flag D. The table size of the deduplication table in destination storage system 126 is 2 (less than the table size 5 of the deduplication table in the source storage system), and there are no entries in this deduplication table in the initial state. In the left-to-right and top-to-bottom order, since data blocks 916, 918, and 920 are not marked with flag D, their fingerprints are not calculated, and the deduplication table is not queried. Data block 922 is received, and since it has flag D, the fingerprint of data block 922 is calculated, and the deduplication table is queried to check whether an entry in the deduplication table can be hit. Since the deduplication table is initially empty, a new entry corresponding to data block 922 is added. Data block 924 is then received, and since it has flag D, the fingerprint of data block 924 is calculated, and the deduplication table is queried to check whether an entry in the deduplication table can be hit. After the fingerprint is calculated and the deduplication table is queried, a corresponding new entry is added to the deduplication table. As a result, except for data block 922, all data blocks that have the same fingerprint as that of data block 922 are deduplicated, and only compressed data 1026 is stored in the physical space of the destination storage system. Similarly, except for data block 924, all data blocks that have the same fingerprint as that data block 924 are deduplicated and only compressed data 1028 is stored in the physical space of the destination storage system. Other data blocks are not deduplicated online because they do not have flag D. As a result, data blocks with the smallest compression ratios in the physical space are all deduplicated, while data blocks for which online deduplication is not performed have very high compression ratios, thus reducing the occupation of physical space. In addition, fingerprints are calculated 10 times, and the deduplication table is queried 10 times in total in this process, which reduces the consumption of CPU and memory and improves the speed of data backup compared to the conventional solutions.

The number of duplications for each data block is the same in the above examples. In some embodiments, it is even not possible to obtain a valid number of duplications. In cases where it is not possible to obtain the numbers of duplications, source storage system 109 can simply set the numbers of duplications for the data blocks to the same value (e.g., 100). In this way, the compression ratios for data blocks will be an important factor when selecting a deduplication candidate. Examples in which different data blocks have different compression ratios and different numbers of duplications will be described below.

Figure 7A:
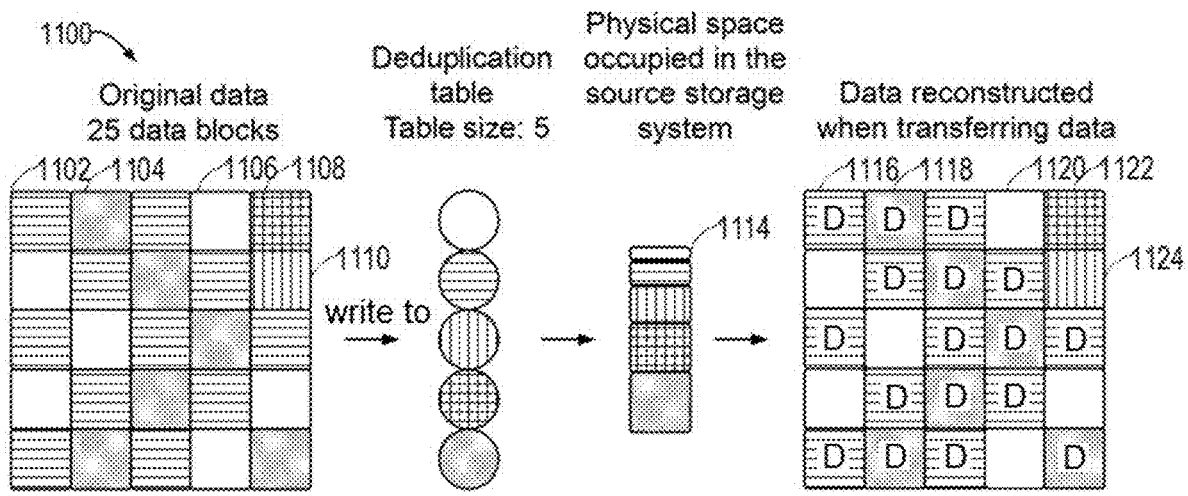
FIGS. 7A to 7B illustrate a schematic diagram of performing deduplication and transmission of data in a source storage system and a schematic diagram of performing data deduplication in a destination storage system according to some other embodiments of the present disclosure.
Figure 7B:
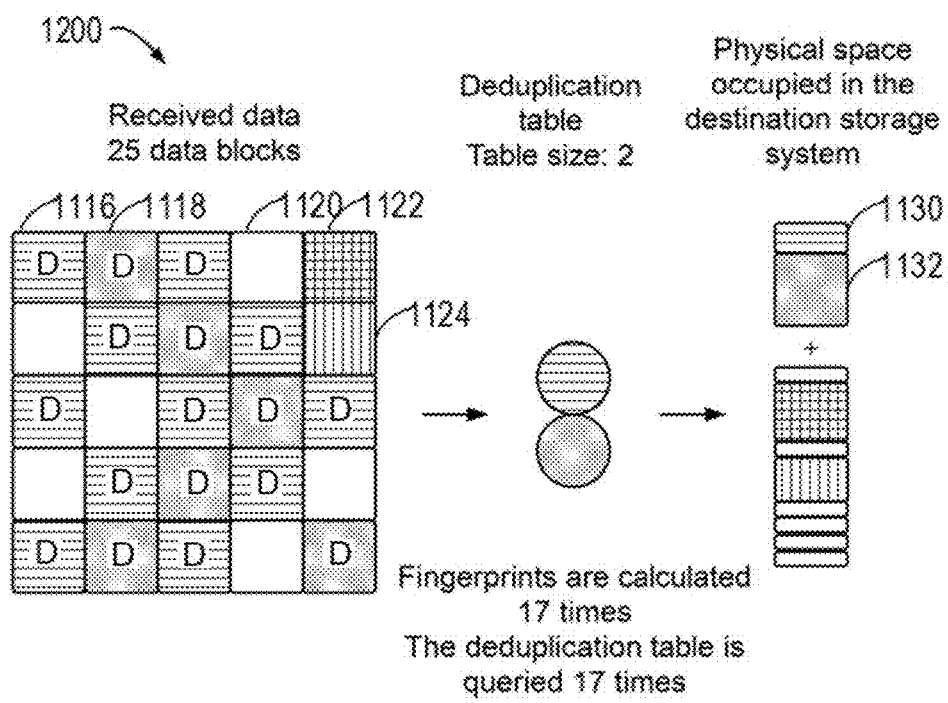

FIGS. 7A to 7B illustrate schematic diagram 1100 of performing deduplication and transmission of data in a source storage system and schematic diagram 1200 of performing data deduplication in a destination storage system according to some other embodiments of the present disclosure. As illustrated in FIG. 7A, the original data includes 25 data blocks, including 11 data blocks 1102, 6 data blocks 1104, 6 data blocks 1106, 1 data block 1108, and one 1110. The table size of the deduplication table of source storage system 109 is 5, and there are no entries in this deduplication table in the initial state. When data block 1102 is written to the source storage system, the fingerprint of data block 1102 is calculated, and the corresponding entry is queried in the deduplication table. Since no corresponding entry is found through querying, data block 1102 is compressed to obtain compressed data 1114, which is stored in the physical space, and the corresponding entry is added to the deduplication table. In this way, the deduplication table is filled with five entries as data blocks 1104, 1106, 1108, and 1110 are written to source storage system 109. As the remaining 20 data blocks are written, by calculating the fingerprints and querying the deduplication table, the 20 blocks are all deduplicated.

After source storage system 109 receives a request to perform a data backup, the compressed data in the physical space is reconstructed into 25 data blocks corresponding to the original data. During reconstruction, it is determined, based on the compression ratios and the numbers of duplications for a data block, whether to mark that data block with a flag indicating deduplication needed in order to make it a deduplication candidate. In this example, data block 1104 can be made to satisfy the conditions that the compression ratio is less than the compression ratio threshold and the number of duplications is greater than 5 by setting a suitable compression ratio threshold, setting a duplication threshold of 5, and M of 2. At the same time, data block 1102 is made to satisfy the conditions that the compression ratio is less than the compression ratio threshold and the number of duplications is greater than 10. Thus, data blocks having the same fingerprint as those of data blocks 1102 and 1104 will all be marked with flag D (indicating need for deduplication).

FIG. 7B illustrates schematic diagram 1200 of performing data deduplication in a destination storage system according to some other embodiments of the present disclosure. As illustrated in FIG. 7B, destination storage system 126 receives the 25 data blocks reconstructed in FIG. 7A, including data blocks 1116, 1118, 1120, 1122, and 1124 and 20 data blocks with the same fingerprint as theirs. Among them, data blocks 1116 and 1118 and the data blocks having the same fingerprint as theirs are marked with flag D. The table size of the deduplication table in destination storage system 126 is 2 (less than the table size 5 of the deduplication table in the source storage system), and there are no entries in this deduplication table in the initial state. In the left-to-right and top-to-bottom order, data block 1116 is received, and since it has flag D, the fingerprint of data block 1116 is calculated, and the deduplication table is queried to check whether an entry in the deduplication table can be hit. Since the deduplication table is initially empty, a new entry corresponding to data block 1116 is added. Data block 1118 is then received, and since it has flag D, the fingerprint of data block 1118 is calculated, and the deduplication table is queried to check whether an entry in the deduplication table can be hit. After the fingerprint is calculated and the deduplication table is queried, a corresponding new entry is added to the deduplication table. As a result, except for data block 1116, all data blocks that have the same fingerprint as that of data block 1116 are deduplicated, and only compressed data 1030 is stored in the physical space of the destination storage system. Similarly, except for data block 1118, all data blocks that have the same fingerprint as that of data block 1118 are deduplicated, and only compressed data 1032 is stored in the physical space of the destination storage system. Other data blocks are not deduplicated online because they do not have flag D. As a result, the compression ratios of the two data blocks for which deduplication is performed are both small, thus reducing the occupation of physical space. In addition, fingerprints are calculated 17 times, and the deduplication table is queried 17 times in total in this process, which reduces the consumption of CPU and memory and improves the speed of data backup compared to the conventional solutions.

Figure 8A:
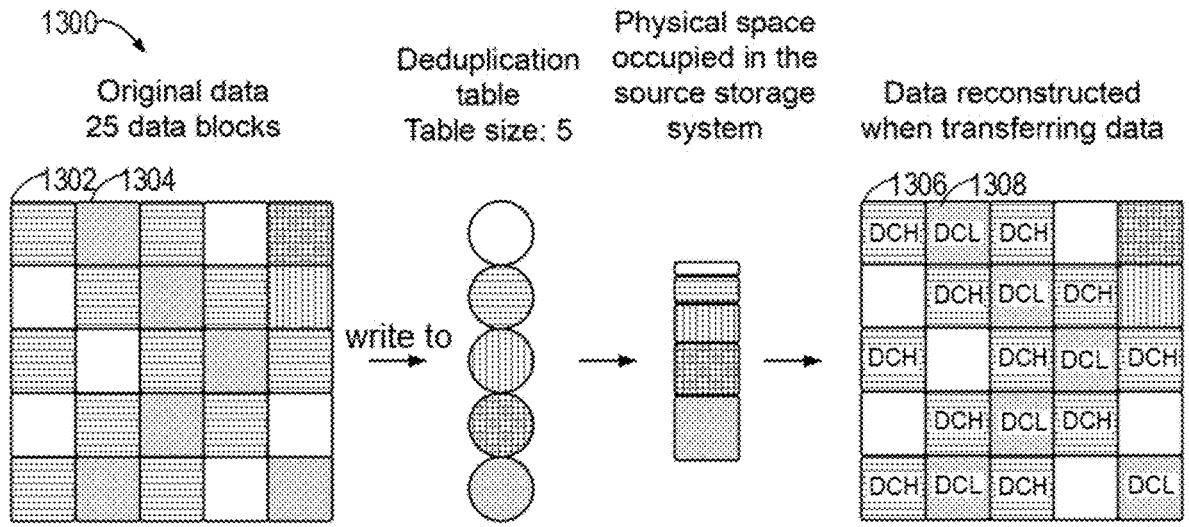
FIGS. 8A to 8B illustrate a schematic diagram of performing deduplication and transmission of data in a source storage system and a schematic diagram of performing data deduplication in a destination storage system according to some other embodiments of the present disclosure.
Figure 8B:
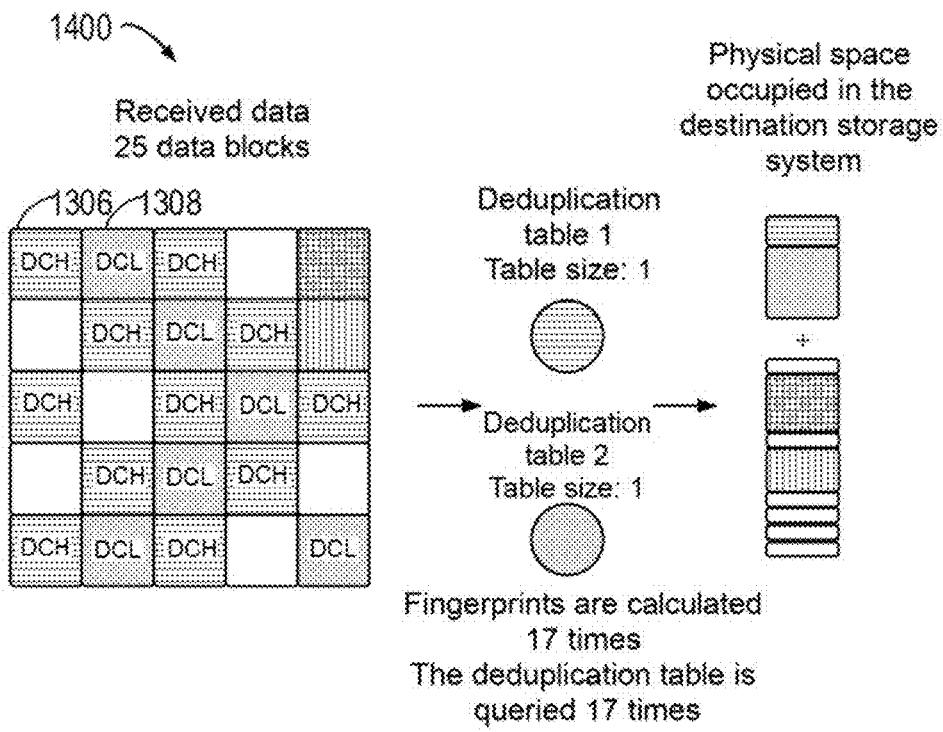

FIGS. 8A to 8B illustrate schematic diagram 1300 of performing deduplication and transmission of data in a source storage system and schematic diagram 1400 of performing data deduplication in a destination storage system according to some other embodiments of the present disclosure. This example differs from the examples illustrated in FIGS. 7A through 7B in that, in FIG. 8A, data block 1304 satisfying the conditions that the compression ratio is less than the compression ratio threshold and the number of duplications is greater than 5 as well as data blocks having the same fingerprint as its fingerprint are marked with flag DCL, while data block 1302 satisfying the conditions that the compression ratio is less than the compression ratio threshold and the number of duplications is greater than 10 is marked with flag DCH.

As illustrated in FIG. 8B, destination storage system 126 has two deduplication tables, both of which have a table size of 1. Deduplication table 1 corresponds to flag DCH, and deduplication table 2 corresponds to flag DCL. When data block 1306 is received, since it has flag DCH, the fingerprint of data block 1116 is calculated, and deduplication table 1 is queried to check whether an entry in deduplication table 1 can be hit. Since deduplication table 1 is initially empty, a new entry corresponding to data block 1306 is added. Data block 1308 is then received, since it has flag DCL, the fingerprint of data block 1118 is calculated, and deduplication table 2 is queried to check whether an entry in deduplication table 2 can be hit. After the fingerprint is calculated and the deduplication table is queried, a corresponding new entry is added to the deduplication table. As a result, except for data block 1306, all data blocks that have the same fingerprint as that of data block 1306 are deduplicated. Similarly, except for data block 1308, all data blocks that have the same fingerprint as that of data block 1308 are deduplicated. Other data blocks are not deduplicated online because they do not have flag DCL or DCH. Compared with the conventional solutions, this example reduces the scope of fingerprint comparison and improves the efficiency of querying the deduplication table by separately marking deduplication candidates satisfying two conditions with different flags in source storage system 109, and performing in destination storage system 126, for different flags, fingerprint comparison in the corresponding deduplication tables.

Figure 9A:
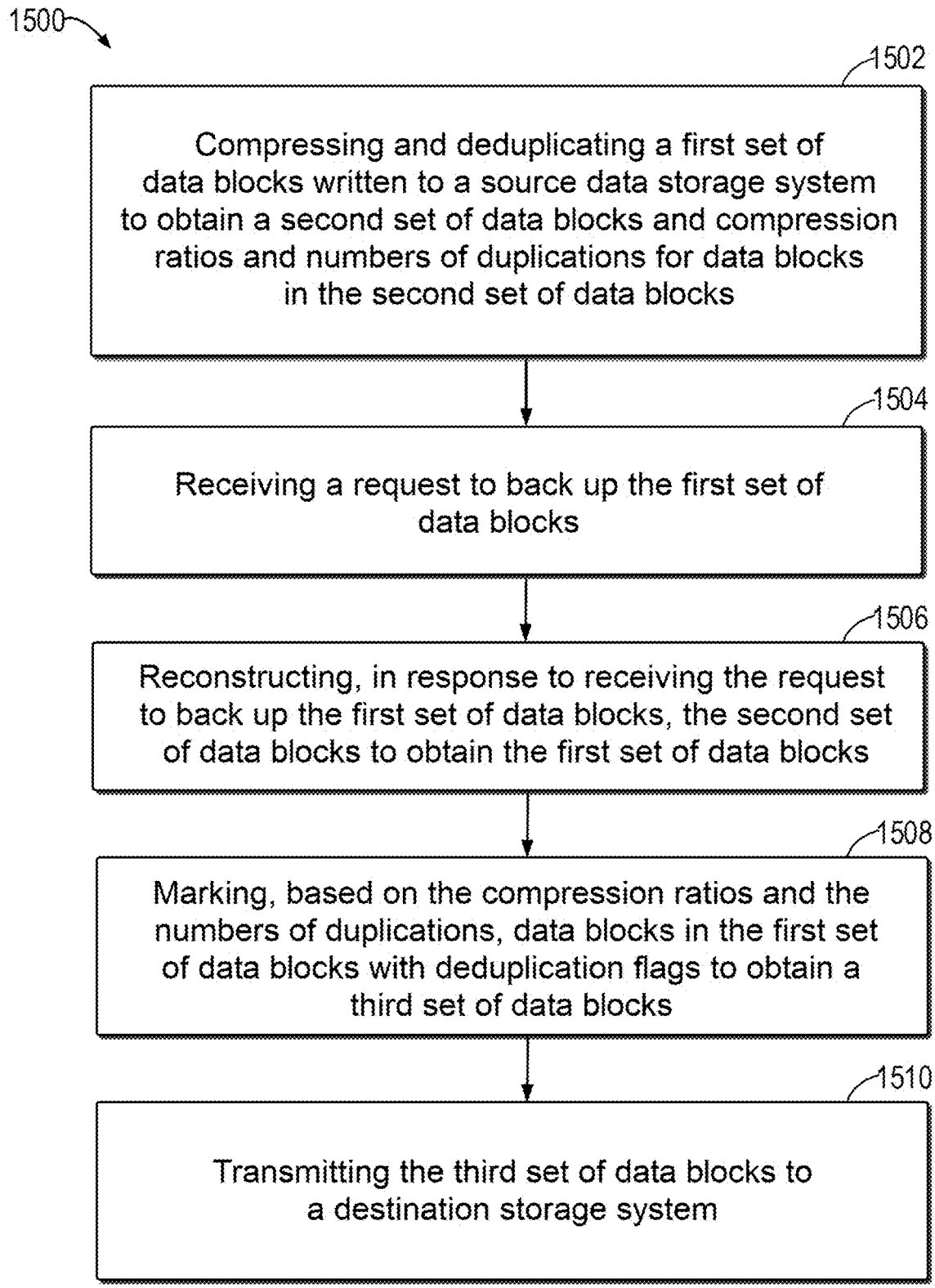
FIGS. 9A to 9B illustrate a flow chart of performing a method for data deduplication in a source storage system and a flow chart of performing a method for data deduplication in a destination storage system according to some embodiments of the present disclosure.
Figure 9B:
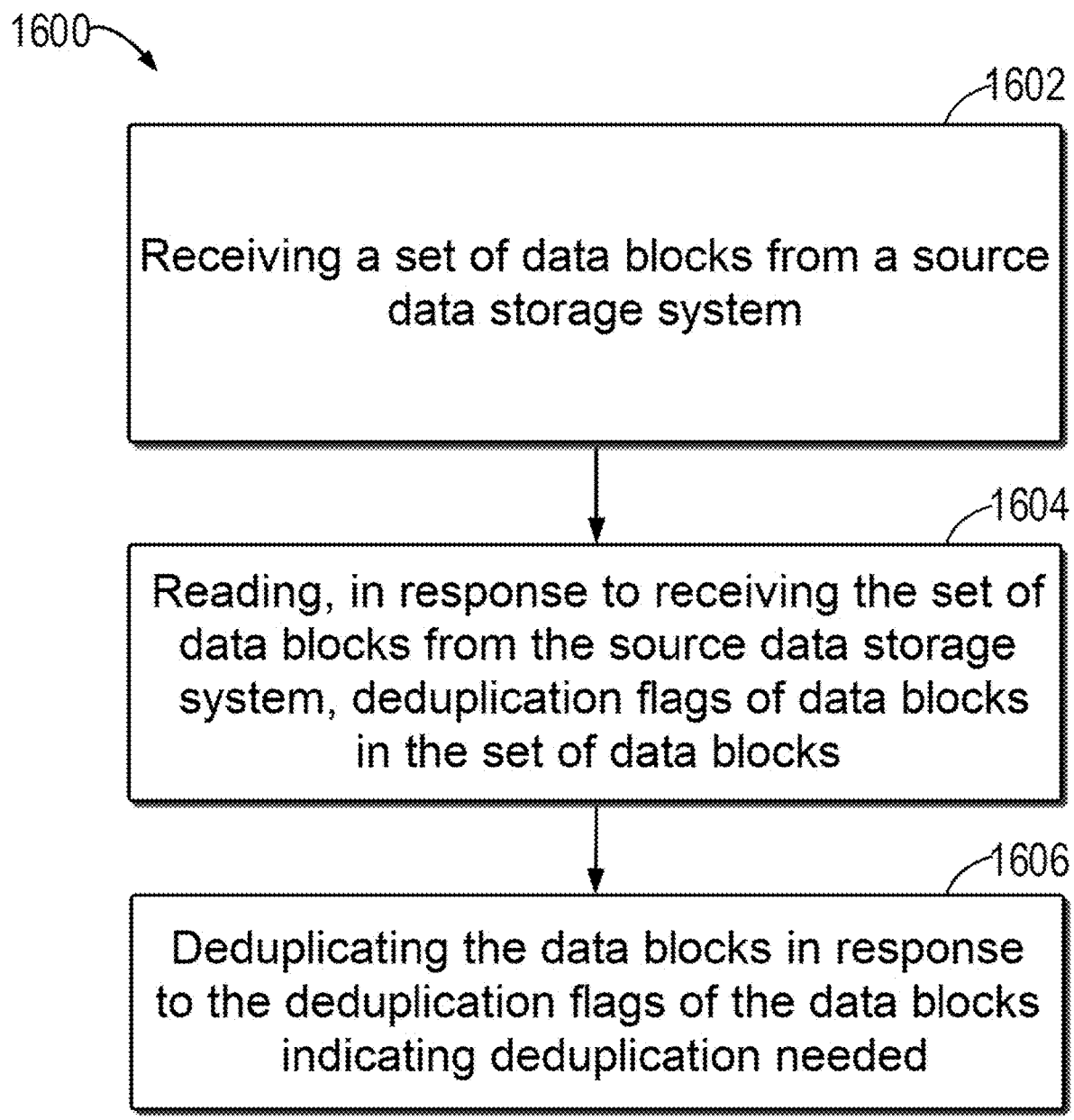

FIGS. 9A to 9B illustrate a flow chart of performing method 1500 for data deduplication in a source storage system and a flow chart of performing method 1600 for data deduplication in a destination storage system according to some embodiments of the present disclosure. As illustrated in FIG. 9A, at block 1502, method 1500 compresses and deduplicates a first set of data blocks written to a source data storage system to obtain a second set of data blocks and compression ratios and numbers of duplications for data blocks in the second set of data blocks.

At block 1504, method 1500 receives a request to back up the first set of data blocks. For example, as illustrated in FIG. 1, the first set of data blocks may be data blocks 102, 103, 104, 105, 106, 107, and 108 in original data 101, which are written to source storage system 109 and are deduplicated as they are written, so that the original data is stored in physical space 114 of source storage system 109 in the form of deduplication table 110 and compressed data 115, 116, and 117. Source storage system 109 may receive a request to back up the original data to destination storage system 126.

At block 1506, method 1500 reconstructs, in response to receiving the request to back up the first set of data blocks, the second set of data blocks to obtain the first set of data blocks. For example, as illustrated in FIG. 1, upon receiving the request to back up the data blocks in original data 101, the set of compressed data is reconstructed into reconstructed data 118 based on deduplication table 110 as well as compressed data 115, 116, and 117 stored in physical space 114.

At block 1508, method 1500 marks, based on the compression ratios and the numbers of duplications, data blocks in the first set of data blocks with deduplication flags to obtain a third set of data blocks. For example, as illustrated in FIG. 1, method 1500 marks, based on the compression ratios and the numbers of duplications, data blocks 119, 120, 121, 122, and 123 in reconstructed data 118 with deduplication flags. Because data blocks 124 and 125 do not satisfy the compression ratio and number-of-duplications requirements, they are not marked with a flag indicating deduplication needed, or are marked with a flag indicating deduplication not needed.

At block 1510, method 1500 transmits the third set of data blocks to the destination storage system. For example, as illustrated in FIG. 1, the reconstructed data with the deduplication flags is transmitted to destination storage system 126.

FIG. 9B illustrates a flow chart of performing method 1600 for data deduplication in a destination storage system. At block 1602, method 1600 receives a set of data blocks from a source data storage system. For example, as illustrated in FIG. 1, destination storage system 126 receives reconstructed data 118 from source storage system 109. Reconstructed data 118 includes data blocks 119, 120, 121, 122, 123, 124, and 125.

At block 1604, method 1600 reads, in response to receiving the set of data blocks from the source data storage system, deduplication flags of data blocks in the set of data blocks. For example, as illustrated in FIG. 1, data blocks 119, 120, 121, 122, and 123 in reconstructed data 118 all carry a flag indicating deduplication needed. Data blocks 124 and 125, on the other hand, do not carry a flag indicating deduplication needed, or carry a flag indicating deduplication not needed.

At block 1606, method 1600 deduplicates the data blocks in response to the deduplication flags of the data blocks indicating need for deduplication. For example, as illustrated in FIG. 1, method 1600 determines that data block 119 carries the flag indicating deduplication needed, and then performs deduplication on data block 119 using information in deduplication table 127.

In method 1500 and method 1600 described above, the information on the compression ratios and the numbers of duplications of the data blocks can be used to determine data block candidates that are more preferably to be deduplicated in the destination storage system, thereby saving physical space in the destination storage system. In the solutions according to the embodiments of the present disclosure, since the destination storage system performs deduplication only for the data block candidates that are marked as needing deduplication, the calculation number of fingerprinting calculation for data blocks and the query number of querying the deduplication table in the destination storage system are reduced, thereby saving the consumption of CPU and memory and increasing the speed of the entire data backup process.

Figure 10:
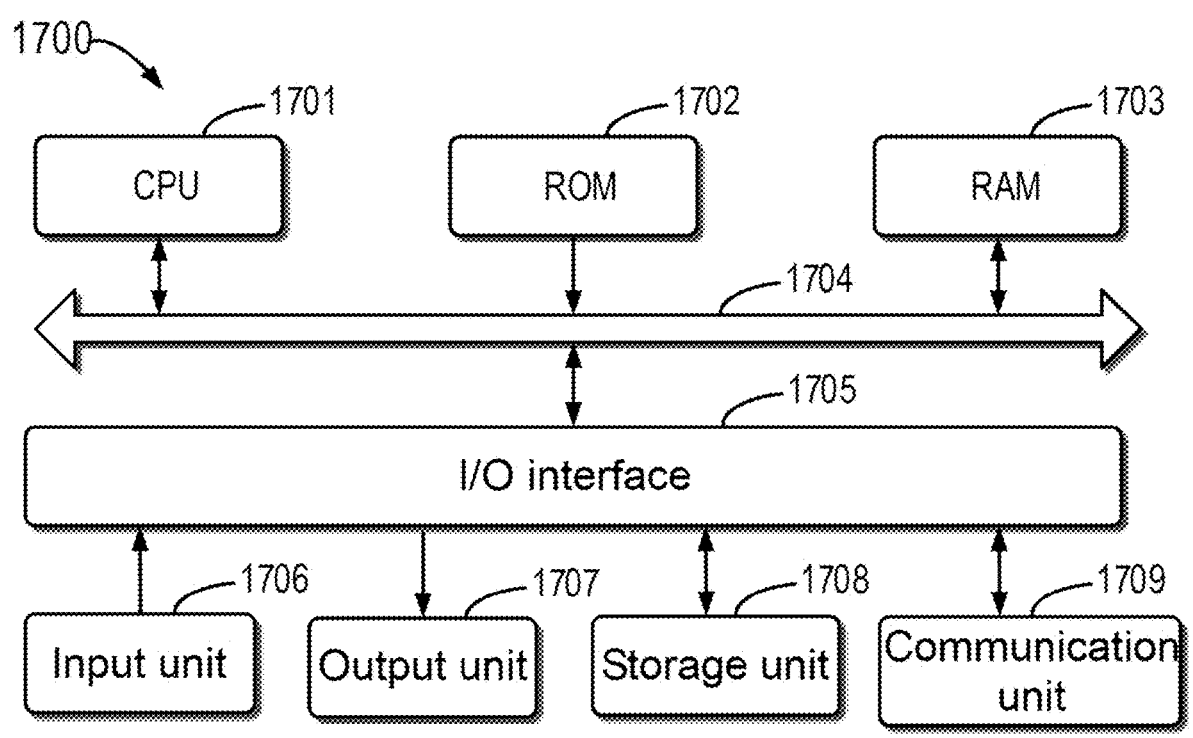
FIG. 10 illustrates a block diagram of a device that can implement a plurality of embodiments of the present disclosure.

FIG. 10 illustrates a schematic block diagram of example device 1700 that can be used to implement embodiments of the present disclosure. As illustrated in the figure, device 1700 includes computing unit 1701 that may execute various appropriate actions and processing according to computer program instructions stored in read-only memory (ROM) 1702 or computer program instructions loaded from storage unit 1708 to random access memory (RAM) 1703. Various programs and data required for operation of device 1700 may further be stored in RAM 1703. Computing unit 1701, ROM 1702, and RAM 1703 are connected to each other through bus 1704. Input/output (I/O) interface 1705 is also connected to bus 1704.

A plurality of components in device 1700 are connected to I/O interface 1705, including: input unit 1706, such as a keyboard and a mouse; output unit 1707, such as various types of displays and speakers; storage unit 1708, such as a magnetic disk and an optical disc; and communication unit 1709, such as a network card, a modem, and a wireless communication transceiver. Communication unit 1709 allows device 1700 to exchange information/data with other devices via a computer network, such as the Internet, and/or various telecommunication networks.

Computing unit 1701 may be various general-purpose and/or special-purpose processing components with processing and computing capabilities. Some examples of computing units 1701 include, but are not limited to, central processing units (CPUs), graphics processing units (GPUs), various specialized artificial intelligence (AI) computing chips, various computing units for running machine learning model algorithms, digital signal processors (DSPs), and any appropriate processors, controllers, microcontrollers, etc. Computing unit 1701 performs various methods and processing described above, such as method 1500. For example, in some embodiments, method 1500 may be implemented as a computer software program that is tangibly included in a machine-readable medium, such as storage unit 1708. In some embodiments, part or all of the computer program may be loaded and/or installed to device 1700 via ROM 1702 and/or communication unit 1709. When the computer program is loaded to RAM 1703 and executed by computing unit 1701, one or more steps of method 1500 described above may be performed. Alternatively, in other embodiments, computing unit 1701 may be configured to implement method 1500 in any other suitable manners (such as by means of firmware).

The functions described herein above may be performed, at least in part, by one or a plurality of hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code can be completely executed on a machine, partially executed on a machine, partially executed on a machine as an independent software package and partially executed on a remote machine, or completely executed on a remote machine or a server.

In the context of the present disclosure, a machine-readable medium may be a tangible medium that may include or store a program for use by an instruction execution system, apparatus, or device or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include a one or more wires-based electrical connection, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combinations thereof. Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

The invention claimed is:

1. A method for data deduplication, comprising:
    receiving, at a source data storage system, a request to write a first set of data blocks to the source data storage system;
    in response to the request to write the first set of data blocks:
        deduplicating the data blocks in the first set, each deduplicated data block having a corresponding number of duplications in data blocks originally written to the source data storage system; and
        compressing the deduplicated data blocks to obtain a second set of data blocks, each data block in the second set having a corresponding compression ratio;
    receiving, at the source data storage system, a request for data back up;
    in response to the request for data back up:
        reconstructing the first set of data blocks from the second set of data blocks;
        marking the reconstructed data blocks with deduplication flags to obtain a third set of data blocks, each deduplication flag indicating whether a deduplication operation needs to be performed on a respective data block from among the data blocks in the third set; and
        transmitting the third set of data blocks to a destination storage system.

2. The method according to claim 1, wherein marking the reconstructed data blocks with deduplication flags comprises:
    marking the respective data block with the deduplication flag indicating that the deduplication operation needs to be performed in response to the corresponding compression ratio for the respective data block being less than a compression ratio threshold and the corresponding number of duplications for the respective data block being greater than a number-of-duplications threshold.

3. The method according to claim 1, wherein marking the reconstructed data blocks with deduplication flags comprises:
    marking the respective data block with the deduplication flag indicating that the deduplication operation does not need to be performed in response to the corresponding compression ratio for the respective data block being less than a compression ratio threshold and the corresponding number of duplications for the respective data block being not greater than a number-of-duplications threshold.

4. The method according to claim 1, wherein marking the reconstructed data blocks with deduplication flags comprises:
    marking the respective data block with the deduplication flag indicating that the deduplication operation needs to be performed in response to the corresponding compression ratio for the respective data block being greater than a compression ratio threshold and the corresponding number of duplications for the respective data block being greater than a number-of-duplications threshold.

5. The method according to claim 1, wherein marking the reconstructed data blocks with deduplication flags comprises:
    marking the respective data block with the deduplication flag indicating that the deduplication operation does not need to be performed in response to the corresponding compression ratio for the respective data block being greater than a compression ratio threshold and the corresponding number of duplications for the respective data block being not greater than a number-of-duplications threshold.

6. An electronic device, comprising:
    at least one processor; and
    a memory coupled to the at least one processor and having instructions stored thereon, wherein the instructions, when executed by the at least one processor, cause the electronic device to perform actions comprising:
receiving, at a source data storage system, a request to write a first set of data blocks to the source data storage system;
in response to the request to write the first set of data blocks:
deduplicating the data blocks in the first set, each deduplicated data block having a corresponding number of duplications in data blocks originally written to the source data storage system; and
compressing the deduplicated data blocks to obtain a second set of data blocks, each data block in the second set having a corresponding compression ratio;
receiving, at the source data storage system, a request for data back up;
in response to the request for data back up:
reconstructing the first set of data blocks from the second set of data blocks;
marking the reconstructed data blocks with deduplication flags to obtain a third set of data blocks, each deduplication flag indicating whether a deduplication operation needs to be performed on a respective data block from among the data blocks in the third set; and
transmitting the third set of data blocks to a destination storage system.

7. The device according to claim 6, wherein marking the reconstructed data blocks with deduplication flags comprises:
marking the respective data block with the deduplication flag indicating that the deduplication operation needs to be performed in response to the corresponding compression ratio for the respective data block being less than a compression ratio threshold and the corresponding number of duplications for the respective data block being greater than a number-of-duplications threshold.

8. The device according to claim 6, wherein marking the reconstructed data blocks with deduplication flags comprises:
marking the respective data block with the deduplication flag indicating that the deduplication operation does not need to be performed in response to the corresponding compression ratio for the respective data block being less than a compression ratio threshold and the corresponding number of duplications for the respective data block being not greater than a number-of-duplications threshold.

9. The device according to claim 6, wherein marking the reconstructed data blocks with deduplication flags comprises:
marking the respective data block with the deduplication flag indicating that the deduplication operation needs to be performed in response to the corresponding compression ratio for the respective data block being greater than a compression ratio threshold and the corresponding number of duplications for the respective data block being greater than a number-of-duplications threshold.

10. The device according to claim 6, wherein marking the reconstructed data blocks with deduplication flags comprises:
marking the respective data block with the deduplication flag indicating that the deduplication operation does not need to be performed in response to the corresponding compression ratio for the respective data block being greater than a compression ratio threshold and the corresponding number of duplications for the respective data block being not greater than a number-of-duplications threshold.

11. A computer program product having a non-transitory computer readable medium which stores a set of instructions to perform data deduplication; the set of instructions, when carried out by computerized circuitry, causing the computerized circuitry to perform a method of:
receiving, at a source data storage system, a request to write a first set of data blocks to the source data storage system;
in response to the request to write the first set of data blocks:
deduplicating the data blocks in the first set, each deduplicated data block having a corresponding number of duplications in data blocks originally written to the source data storage system; and
compressing the deduplicated data blocks to obtain a second set of data blocks, each data block in the second set having a corresponding compression ratio;
receiving, at the source data storage system, a request for data back up;
in response to the request for data back up:
reconstructing the first set of data blocks from the second set of data blocks;
marking the reconstructed data blocks with deduplication flags to obtain a third set of data blocks, each deduplication flag indicating whether a deduplication operation needs to be performed on a respective data block from among the data blocks in the third set; and
transmitting the third set of data blocks to a destination storage system.

* * * * *